United States Patent Office 2,726,793
Patented Dec. 13, 1955

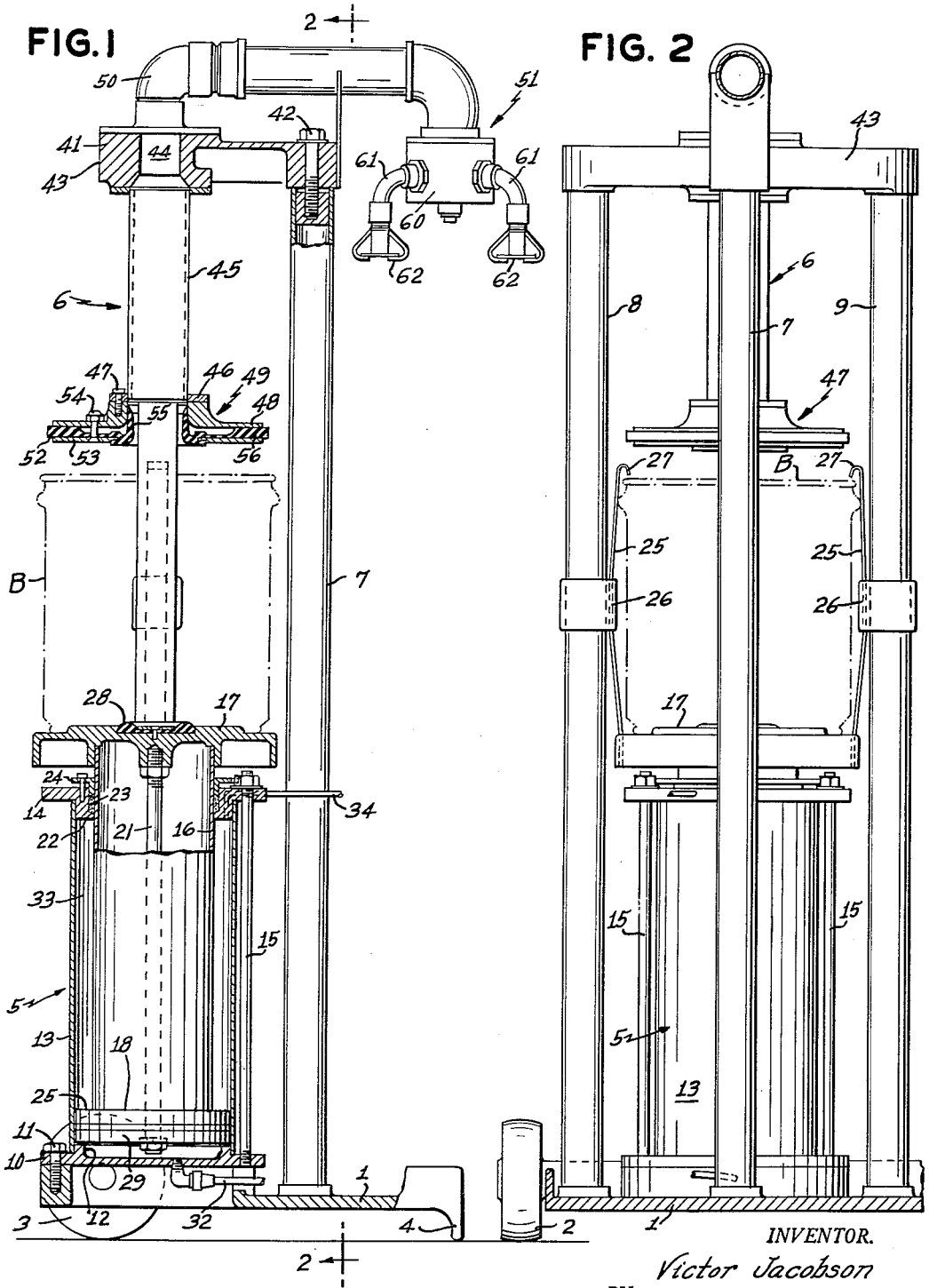

2,726,793
APPARATUS FOR DISPENSING ADHESIVE MATERIAL

Victor Jacobson, New Rochelle, N. Y., assignor to Jacobson Research Inc., New York, N. Y., a corporation of New York Application August 26, 1952, Serial No. 306,388

6 Claims. (Cl. 222—330)

This invention relates to devices for dispensing plastic materials, and has for its object the provision of an improved apparatus for dispensing plastic material from buckets or like containers. More particularly, the invention is concerned with the provision of a portable apparatus for forcing the plastic material out of the bucket and through one or more nozzles of a dispensing or applicator means.

It is the present practice in the bonding of tiles or slabs of finishing materials, such as ceramic, metal or fibrous tiles to walls or ceilings, to put dabs of a viscous adhesive on one or more spots of each tile and then press it onto the surface. This is a laborious and messy operation largely due to the difficulty of removing uniformly small amounts of adhesive from the container. Moreover, the material is exposed to setting conditions while being used, and is very difficult to remove from the sides and bottom of the container with the result that a considerable amount of the material is wasted.

My invention overcomes the aforementioned difficulties and provides an efficient and rapid means for removing the adhesive from the container without exposing it and delivering it to an applicator at a uniform controlled rate at a conveniently located position whereby the labor of the workmen is reduced materialy and the rate of applying the adhesive to and setting the tiles is greatly increased.

In one of its important aspects the invention provides means for removing almost the entire content of a viscous adhesive material from a cylindrical container such as a bucket and delivering it to the applicator through a duct with a minimum of waste and contamination. To this end the invention provides a piston connected to a delivery duct for entering the bucket having a piston member that is expansible into a snug fitting contact with the bucket under the pressure necessary to force the adhesive through the duct to the applicator.

The apparatus comprises an upwardly movable platform for the bucket which pushes the bucket over the piston to force the adhesive through the duct to the applicator. Preferably means are attached to the platform to engage the bucket and pull it off the piston on the return stroke of the piston and this removal of the bucket is facilitated by the shrinkage of the expansible piston when the pressure is removed.

The invention provides a sealing means on the platform for the duct whereby, on removal of a bucket at the end of a day's operation, the platform may be elevated to bring the sealing means into closing contact with the duct and prevent setting or escape of the adhesive.

These and other objects of the invention will be better understood after considering the following discussion taken in conjunction with the accompanying drawings, in which:

Fig. 1 is a side view partly in section of an adhesive dispensing apparatus embodying the invention;

Fig. 2 is an exterior side view of the apparatus of Fig. 1 taken at right angles;

Figure 3:
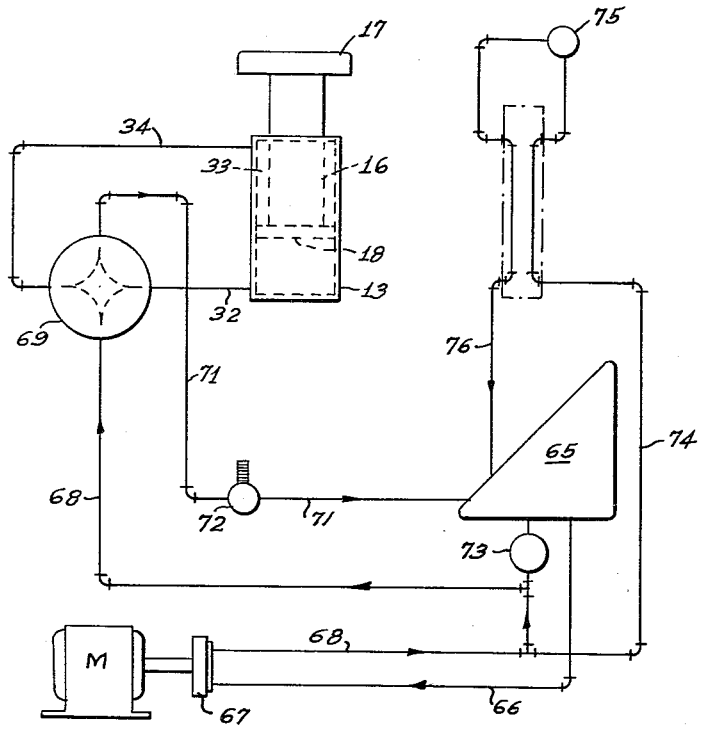
Fig. 3 is a schematic diagram of a fluid supply system for operating the pistons.

The apparatus illustrated in the drawings comprises a base 1 mounted on wheels 2 and 3 and an integral foot 4 for supporting the apparatus in a stable three-point position. The apparatus comprises a platform-operating mechanism 5 attached to the base and an upper structure 6 which is rigidly attached to the base by the three triangularly disposed connecting members 7, 8, and 9 advantageously in the form of pipes.

The mechanism 5 comprises a cylinder head 10 connected by bolts 11 with the base 1 having an annular rim 12 to which is attached the exterior cylinder 13. The annular plate 14 is held in bearing contact with the upper edge of cylinder 13 by four bolts 15 in quadrant position. The inner cylinder 16 is connected at its top to the platform 17 and at its bottom to the piston 18 which operates inside the cylinder 13. The piston 18 is held in fixed contact with the cylinder 16 by the connecting rod 21 which is in threaded connection with the center of the platform 17. The piston 18 may be provided with rings or leather packing cups by well known means, if desired, to effect tight contact with the inside of cylinder 13. The annular plate 14 has a depending bearing portion 22 which effects a close fit with the exterior of the cylinder 16, thereby serving as an oil ring. The annular space 23 is provided with babbitt packing which is held in position by the packing ring 24. The platform has an attached sealing ring 28 of neoprene or similar plastic material, the function of which will be described hereinafter. The upper bearing surface of platform 17 is preferably shaped to receive and center an ordinary cylindrical bucket B of the type customarily used for adhesive materials. Two diametrically opposite bucket holders 25 are attached to the platform and to guides 26 which slide with the holders along the rods 8 and 9. These holders are preferably formed of spring steel and have hooked ends 27 which are snapped over the rim of the bucket.

The entire assembly of cylinder 16, platform 17, piston 18, and rod 21 is reciprocable with respect to the cylinder 13. The cylinder head 10 has an oil pipe connection 32 by means of which oil under pressure is forced inside the cylinder 13 and against the piston 18 to elevate the assembly including the platform. The annular space 33 between the two cylinders has a connecting oil pipe 34 for introducing oil under pressure to force the piston 18 downward after it has completed its upward travel. Pipe 34 is a discharge for oil from space 33 when piston 18 moves upward, and pipe 32 is a discharge for oil from cylinder 13 when piston 18 moves downward, as will be explained with reference to Fig. 3. It will be appreciated that, when oil is supplied to pipes 32 and 34 at a uniform rate, the platform 17 will be elevated at a much slower rate than the return downward movement because of the relative differences in volume between the space inside the cylinder 13 and the volume of the annular space 33. A suitable arrangement for controlling the supply of oil under pressure to the pipes 32 and 34 is illustrated in Figs. 3 and 4.

The upper structure 6 comprises a spider 41 rigidly connected by bolts 42 to the upright rods 7, 8 and 9. The hub portion 43 of the spider has a passageway 44 and is connected, as by welding, to a delivery duct 45, the lower portion of which is connected by flange 46 and bolts 47 to the annular head 48 of the piston 49. The hub is also connected to the duct 50 which connects to the dispenser 51. There is a continuous passageway from the center of the piston 49 through duct 45, hub 43, and duct 50 to the dispenser 51. The piston head 48 has an exterior diameter slightly smaller, say, around ¼ inch, than the inner diameter of the bucket B. The under surface of the piston head 48 has an expansible piston member 52, preferably formed of neoprene (35–40 durometer) held in contact therewith by the annular plate 53 which is connected by bolts 54 to the piston head. The expansible piston member 52 preferably has an upturned sleeve 55 which enters the duct in the piston and a relatively thick exterior bearing portion 56. The exterior diameter of the expansible member 52, when in its normal contracted position, is around ⅛ inch smaller in diameter than the inner diameter of the bucket.

Any suitable applicator may be attached to the duct 50 depending upon the type and size of tile to which the adhesive is applied. The applicator 51 is one particularly suitable for applying four dabs of adhesive simultaneously to the standard 9″ x 9″ tile such as is used for acoustic ceilings. The applicator comprises a head 60 with four connected depending delivery pipes or nozzles 61. When the device is not in use, the adhesive is prevented from flowing out or setting by the spring closures 62 which can be snapped over the ends of the nozzles.

Figure 4:
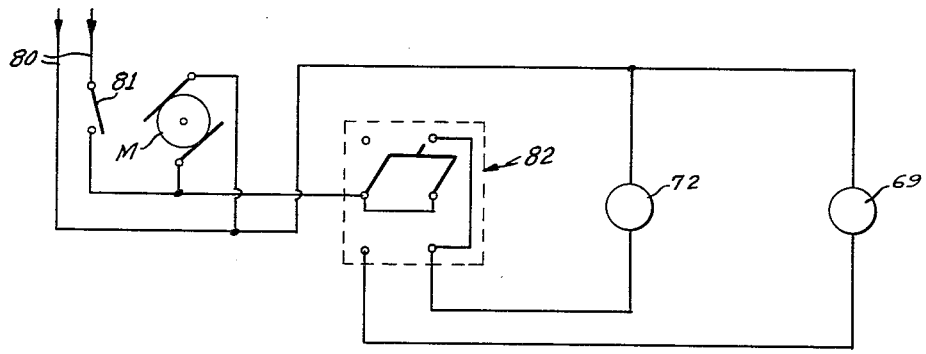
Fig. 4 is a schematic wiring diagram for operating the valves of the fluid system.

Fig. 3 illustrates a fluid system for controlling the operation of the platform 17. The oil supply tank 65 supplies oil through pipe 66 to the motor driven pump 67 which flows through pipe 68 to the four-way solenoid valve 69. This valve is connected by pipes 32 and 34 to the cylinder 13 of piston 18 and the annular cylinder 33 respectively and by the vent line 71 through the solenoid valve 72 to the tank. The pipe 68 is connected to a pressure relief valve 73 which can return excess oil into the tank when undue pressures are encountered. The pipe 68 also connects through pipe 74 with a hand-operated control valve 75 which is connected by pipe 76 to the tank.

The electrical circuit illustrated in Fig. 4 connects the 110-volt supply line 80 through switch 81 to the motor M of the pump 67. The two-way switch 82, when connected in the "up" position, energizes the solenoid valve 72, and when thrown to the "down" position, energizes the solenoid valve 69.

The portable embodiment of the apparatus illustrated is constructed so that it can be conveniently moved around the building under construction on the two wheels and then left standing in a stable position when the foot rests on the floor. The various operating elements are proportioned to receive the customary bucket in which the adhesive is sold. The dispensing means are preferably located such a distance above the floor so that a man in standing position can conveniently press one of the tiles against the adhesive flowing out of the nozzles.

In operating the apparatus, the bucket is placed on the platform and the hooks 27 of holders 25 are snapped over the rim of the bucket. The switch 81 is closed and switch 82 is thrown to the "up" position, thus starting the pump motor and opening valve 72 through the vent line 71. The oil from pump 67 can then flow through pipes 68 and 32 into cylinder 13 and force piston 18 and the platform 17 upward. By means of valve 75 a certain proportion of the oil from the pump can be bypassed through pipes 74 and 76 back to the tank 65 and in this way the rate of upward travel from the platform can be regulated.

As the bucket moves upward into contact with the piston 49 and the viscous material applies pressure on the expansible member 52, the relatively thick peripheral portion is compressed resulting in a radial expansion sufficient to bring the exterior edge into close scraping contact with the interior cylindrical surface of the bucket, thereby removing substantially all of the adhesive material as the piston enters the bucket. The upward travel of the bucket is regulated so that a workman handling the tiles will find a small blob of adhesive extruded from each nozzle each time he applies a tile. By merely pressing the tile upwardly, four uniformly spaced dabs of the material are applied to the tile. The workmen may pass this tile to another workman who applies it to the surface. A rate of flow is maintained such that a proper amount of plastic is extruded from the nozzles by the time the workman presses the next tile into contact therewith.

When the bucket has become emptied, the switch 82 is thrown to the "down" position, thereby reversing the position of the solenoid valve 69 and the oil from pipe 68 flows through pipe 34 to the cylinder 33 forcing the piston 18 and platform 17 downward. This last movement of the solenoid valve opens the passageway for the return of oil from cylinder 13 through pipes 32 and 71 to the tank. This return of the platform will be at a relatively rapid rate due to the relatively small volume of cylinder 33 compared to cylinder 13.

As soon as the pressure is removed from the expansible piston member 52, it contracts leaving an appreciable clearance inside the bucket, thus breaking the vacuum that would otherwise exist and materially reducing the amount of energy required to pull the bucket downwardly off the piston.

At the end of a day's operation, the empty bucket is removed and the platform 17 is elevated to bring the sealing ring 28 into contact with the sleeve portion 55 of the piston 49 and thereby seal the adhesive left in the delivery duct. The sealing members 62 can be sprung over the ends of the nozzles and thereby seal off the material therein.

I claim:

1. Apparatus for the application of a plastic adhesive material to various objects, comprising a piston for entering a cylindrical container for the adhesive, a delivery duct connected to the piston, an applicator on the duct, said piston comprising spaced metal members between which is mounted an expansible plastic member of larger diameter than the metal members which in its contracted position has a smaller diameter than the inside of the container, said expansible member having a relatively thick exterior bearing portion on which the metal members make bearing contact and a relatively thin central portion which extends to the duct, one of said metal members being a fixed part of the piston and the other being movable under pressure thereon to compress the thick exterior portion of the expansible member, a platform for the container, and means for effecting a relative movement of the piston and platform to cause the piston to enter the container and force the adhesive through the duct to the applicator, whereby the pressure on the piston effects an enlargement of the expansible member bringing it into close scraping contact with the inside of the container.

2. Apparatus for the application of plastic adhesive material to various objects comprising a piston for entering a cylindrical container for the adhesive, a delivery duct connected to the piston, an applicator on the duct, said piston comprising spaced metal members between which is mounted an expansible plastic member of larger diameter than the metal members which in its contracted position has a smaller diameter than the inside of the container, said expansible member having a relatively thick exterior bearing portion on which the metal members make bearing contact and a relatively thin central portion which extends to the duct, one of said metal members being a fixed part of the piston and the other being movable under pressure thereon to compress the thick exterior portion of the expansible member, a platform for the container, and means for moving the platform upward at a uniform rate to force the piston into the container and the adhesive through the duct to the applicator, whereby the pressure on the piston effects an enlargement of the expansible member bringing it into close scraping contact with the inside of the container, and means to move the platform downward and pull the container off the piston, in said downward movement the expansible piston member contracts and facilitates removal of the container.

3. A portable apparatus for applying plastic adhesive material to various objects comprising a piston including an expansible neoprene disc for entering a container for the material, said disc having an exterior bearing portion mounted between a fixed portion of the piston and another metal member, and being of larger diameter than the piston and metal member, an applicator supported in a fixed elevated position, a duct connecting the applicator with the piston, a platform on which the container is supported, means for moving the platform upward to cause the piston to enter the container and force the plastic material through the duct to the applicator and downward to remove the empty container, said disc, in its normal contracted position, being smaller in diameter than the inside diameter of the container, but, when the piston is forced against the adhesive material in the container, the disc expands into snug scraping contact with the inside of the container thereby effectively removing the adhesive material from the sides, means on the platform to engage the container and pull it off the container when the platform is moved downward, and means to seal the duct opening to the piston when the apparatus is inoperative.

4. Apparatus according to claim 3 in which the applicator has a plurality of spaced nozzles for applying dabs of adhesive to an object held thereagainst.

5. Apparatus for the application of a plastic adhesive material to various objects, comprising a piston for entering a cylindrical container for the adhesive, a delivery duct connected to the piston, an applicator on the duct, said piston comprising spaced metal members between which is mounted an expansible plastic member which, in its normal contracted position, has a smaller diameter than the inside diameter of the container, a platform for the container, and means for effecting a relative movement of the piston and platform to cause the piston to enter the container and force the adhesive through the duct to the applicator, whereby the pressure on the piston effects an enlargement of the expansible member bringing it into close scraping contact with the inside of the container, and sealing means on the platform for entering the duct when the container is removed to retain the adhesive in the duct when the apparatus is not in operation.

6. A portable apparatus for applying plastic adhesive material to various objects comprising a piston including an expansible neoprene disc for entering a container for the material, an applicator supported in a fixed elevated position, a duct connecting the applicator with the piston, a platform on which the container is supported, means for moving the platform upward to cause the piston to enter the container and force the plastic material through the duct to the applicator and downward to remove the empty container, said disc, in its normal contracted position, being smaller in diameter than the inside diameter of the container, but, when the piston is forced against the adhesive material in the container, the disc expands into snug scraping contact with the inside of the container thereby effectively removing the adhesive material from the sides, means on the platform to engage the container and pull it off the disc when the platform is moved downward, and an elastic member attached to the platform to seal the duct opening to the piston when the apparatus is inoperative.

References Cited in the file of this patent

UNITED STATES PATENTS

| 2,253,150 | Thompson | Aug. 19, 1941 |
| 2,534,782 | Maddux | Dec. 19, 1950 |
| 2,630,248 | Hinz | Mar. 3, 1953 |

FOREIGN PATENTS

| 1,981 | Great Britain | Feb. 4, 1862 |